United States Patent [19]

Godding

[11] 4,200,272
[45] Apr. 29, 1980

[54] HOLDER FOR IRREGULARLY SHAPED ARTICLES

[75] Inventor: Ronald G. Godding, Birmingham, England

[73] Assignee: BCIRA, Birmingham, England

[21] Appl. No.: 914,620

[22] Filed: Jun. 12, 1978

[51] Int. Cl.² .......................................... B25B 11/00
[52] U.S. Cl. ...................................... 269/26; 269/266
[58] Field of Search ................. 269/266, 289 R, 296, 269/309, 26; 51/225

[56] References Cited

U.S. PATENT DOCUMENTS

| | | | |
|---|---|---|---|
| 2,399,824 | 5/1946 | Pressman | 269/266 |
| 3,030,744 | 4/1962 | Mueller | 51/225 |
| 4,088,312 | 5/1978 | Frosch et al. | 269/266 |

Primary Examiner—Robert C. Watson
Attorney, Agent, or Firm—Scrivener, Parker, Scrivener and Clarke

[57] ABSTRACT

A work holder for locating a workpiece of arbitrary or irregular shape during treatment comprises a flat horizontal table in which is mounted a two-dimensional array of vertically disposed spaced-apart rods which protrude upwards through the surface and can be moved upwards individually, either manually or by springs or by fluidpressure means such as rams, then clamped in position so that their tips form a cradle conforming to the shape of the workpiece, in which the workpiece rests.

6 Claims, 11 Drawing Figures

HOLDER FOR IRREGULARLY SHAPED ARTICLES

This invention relates to a work holder for locating a workpiece of arbitrary or irregular shape while it is being subjected to some kind of treatment or action. For example metal castings, after removal from their moulds, generally require to be cleaned by shot-blasting or wire brushing and then may have to be fettled with a hand-held tool to remove runners, feeders and flash. Small and light castings can be brought into engagement with a stand-mounted grinding wheel or bandsaw and turned around by hand to bring the various faces into contact with the wheel or the saw as required. Larger castings, however, too heavy to be held in the hand during treatment, have to be supported in the required attitude on a bench or platform and engaged by hand-held tools, including, for example, suspended flexible shaft grinders, so they need to be held securely. Power-driven tilting and rotating manipulators are known for this purpose but are expensive, and the workpiece has to be clamped to a faceplate or mandrel of the manipulator before treatment and unclamped afterwards, steps which take time.

The aim of the invention is to provide a new and simple way of rapidly and easily locating a workpiece of arbitrary or irregular shape. According to the invention there is proposed a work holder for locating a workpiece of arbitrary or irregular shape during treatment comprising a flat horizontal table in which is mounted a two-dimensional array of vertically disposed rods, spaced apart and protruding, or capable of protruding, upwards through the table and being vertically movable, and means for clamping the rods individually in any vertical position within a range.

Preferably the rods are urged upwards towards upper limiting positions by individual springs. Alternatively they could be mounted on, or form the piston rods of, pneumatic rams to which air is admitted to urge them upwards.

With the rods all initially at their upper limiting positions and with the clamping means released, if a body of any shape is placed on top of the array of rods it will depress the various rods to different extents, and, depending on its weight one or more may be depressed far enough for the body to come into contact with the table. Then the user clamps the rods in position and their upper ends form a bed exactly conforming to the shape of the body and holding it in place.

For supporting large bodies, two or more of the tables described may be arranged side by side.

The invention will now be further described by way of example with reference to the accompanying drawings, in which.

Figure 1:
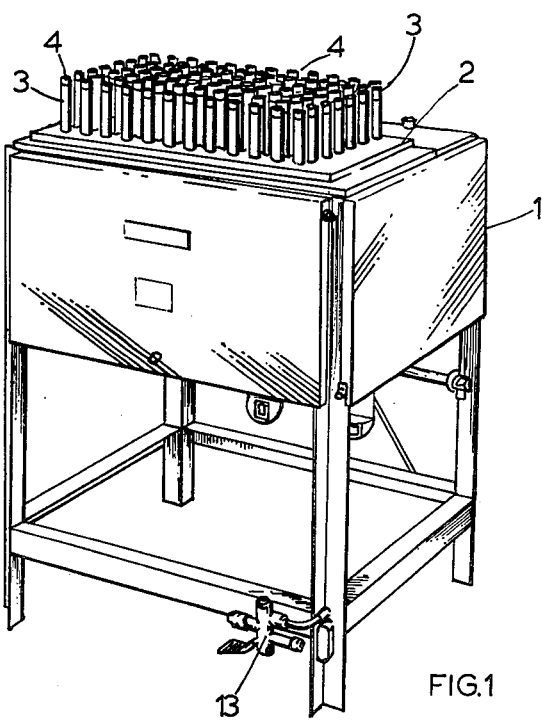
FIG. 1 is a perspective view of a complete bench stand fitted with a work holder according to the invention.
Figure 2:
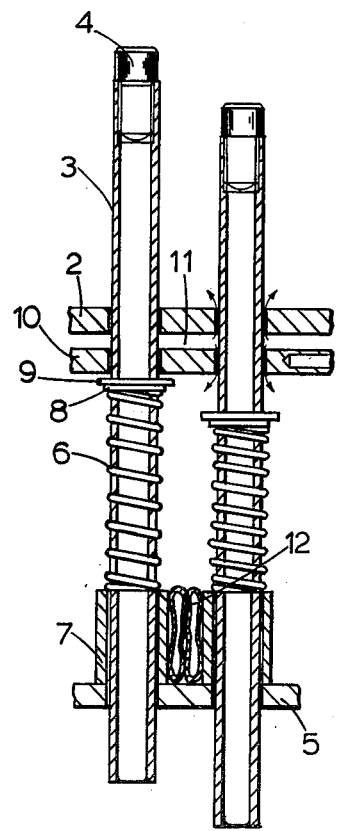
FIG. 2 is a section through part of the work holder of FIG. 1, showing the manner of mounting and clamping the rods.
Figure 3:
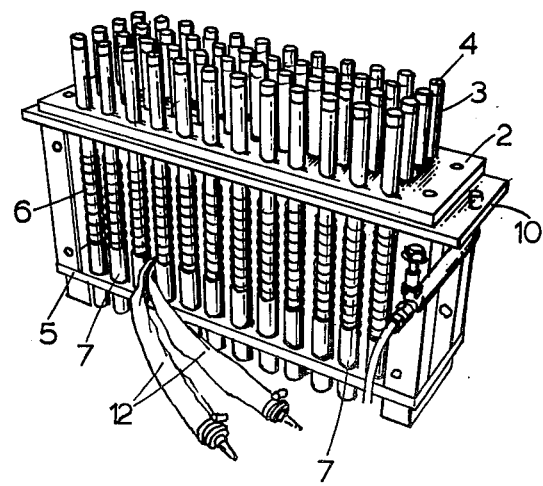
FIG. 3 shows a modular unit forming part of the work holder of FIG. 1.

Referring first to FIGS. 1 to 3, a stand 1 carries a table in the form of a horizontal plate 2 through which protrudes a two-dimensional array of vertical rods 3. In the example shown there are twelve rows of eight rods, i.e. ninety-six in all, but the number and size can be selected to suit requirements. The table of FIG. 1 is in fact made up of two modular table units of the kind shown in FIG. 3, each having forty-eight rods, and it will be understood that any number of these units can be mounted side by side in a stand to give the required supporting area.

As will be seen in FIG. 2, each rod 3 is in the form of a tube, closed at its upper end by a cap screw 4, and mounted to be vertically slidable in a hole in the plate 2 and in a lower horizontal guide plate 5. The rods are spaced apart laterally and longitudinally by distances slightly greater than their own diameter. A helical coil compression spring 6 encircles each rod 3 and has its lower end abutting against a short length of tube 7 that rests on the guide plate 5, whilst its upper end acts through a washer 8 to bear on a cotter pin 9 that passes diametrically through the rod 3, so that the spring urges the rod to its upper limiting position, defined by the engagement of the cotter pin 9 against the underside of a horizontal intermediate plate 10.

The purpose of this intermediate plate is to define, between itself and the upper plate 2, a plenum chamber 11 into which compressed air is admitted continuously during use of the work holder, thereby preventing sand or other fragments penetrating into the clearances around the rods and interfering with free vertical movement of the rods. The path of the air is indicated by the arrows around the right-hand rod in FIG. 2. This rod is also shown partially retracted against the force of the spring 6.

A pair of inflatable flexible hoses 12 runs between each alternate pair of adjacent rows of rods immediately above the bottom guide plate 5. When air is admitted to these hoses 12 they swell up and displace the tubes 7 laterally, thereby frictionally clamping the rods 3 and holding each rod in the individual vertical position that it then occupies.

Before use, the equipment is in the condition shown in FIG. 1, with all the rods 3 at their uppermost limiting positions, with their tips level with one another, and the pneumatic clamps are released. When a body of any shape, for example a casting, is placed on the tips of the rods, the rods will be depressed to varying extents, depending on the shape of the body, and indeed if the body is heavy enough one or more of the rods may be pushed down far enough for at least one point on the body to come into contact with the plate 2. By means of a foot-controlled valve, indicated at 13 in FIG. 1, the user then admits air to the hoses 12, clamping the rods in the positions they then occupy. At the same time air is admitted to the plenum chamber 11.

It will be appreciated that the array of rods is then forming a cradle that supports the casting or other body at many points, indeed a number equal to the number of rods over which the body lies, so it is securely held during the subsequent treatment, for example with a hand-held flexible shaft grinder.

On completion of the treatment the user releases the pneumatic clamping (by means of the foot-controlled valve 13) and lifts off the casting. Alternatively, where a run of castings of substantially identical shape is to be treated, he may leave the rods clamped and simple exchange the casting for a fresh one, and the clamping is only released at the end of the run.

Provision may be made for reducing the clamping pressure to an intermediate value, lower than that which clamps the rods securely. Then after the casting has been positioned and the rods clamped, the operator can, for a moment, reduce the pressure to this intermediate value while he manually pushes down to table level the tips of those rods which lie clear of the casting. The intermediate pressure is low enough to allow the user to push the rods down but sufficient to hold the rods frictionally in these positions against the action of the springs. The user then restores the higher pressure. This provision allows the user to obtain improved access to the casting by eliminating those rods not actually employed in supporting it.

The user may, of course, hold a given casting in each of several different attitudes during treatment, momentarily releasing the pressure while he turns the casting to its new attitude.

Within the scope of the invention it would be possible to mount the table to rotate about a vertical axis for further simplifying movement of the casting to the required positions for treatment.

The tips of the rods 4 may be made easily replaceable in the event of damage or where it is desired to replace the cap head screws by hardened tips, or by soft tips of synthetic resin or even rubber.

Figure 4:
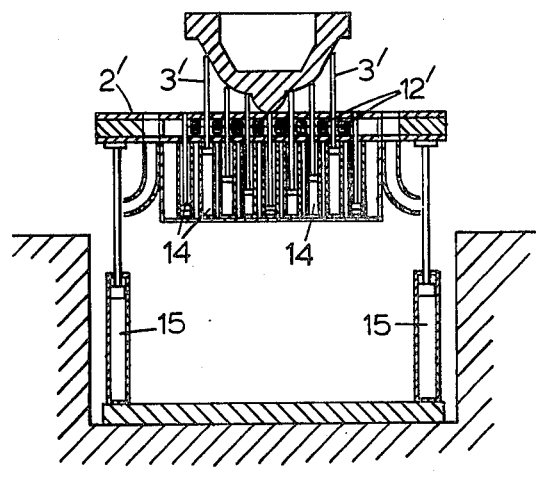
FIG. 4 shows a second embodiment of the invention, in which the rods are actuated pneumatically instead of by springs and in which the whole table is itself vertically movable.
Figures 5A, 5B, 5C, 5D, 5E, 5F, 5G:
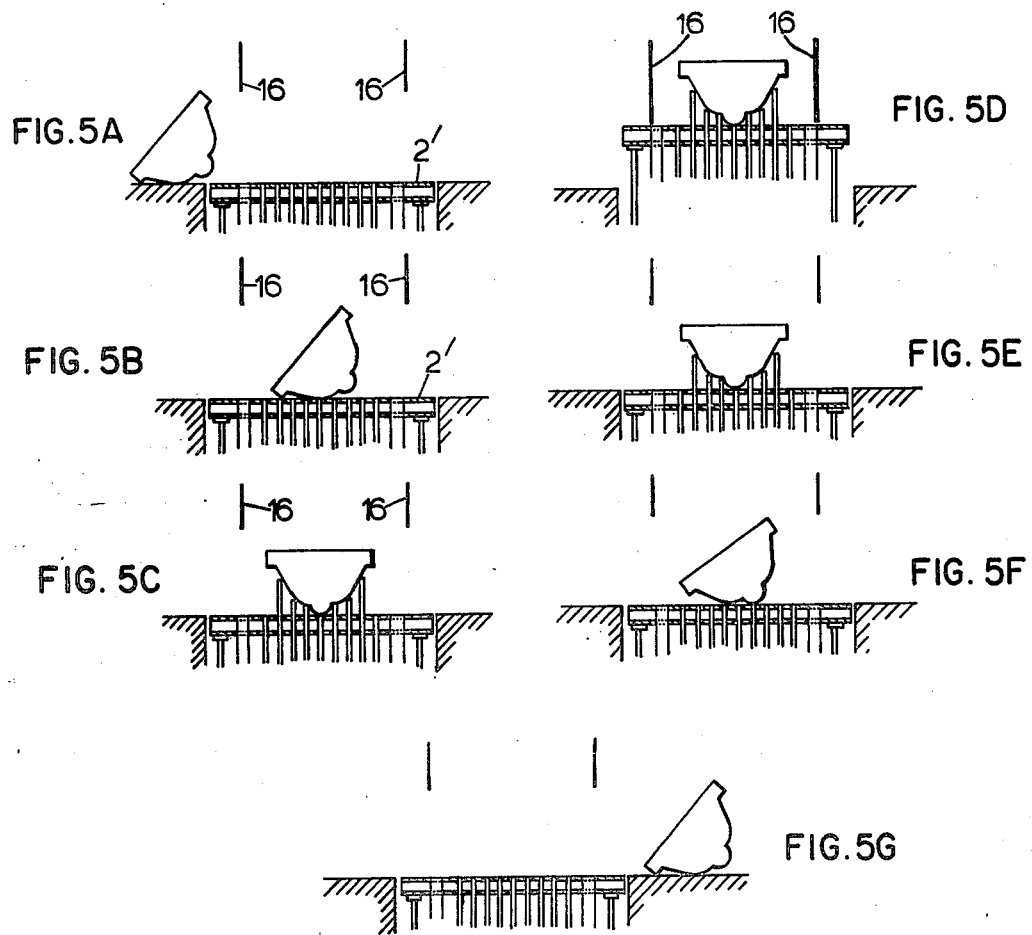
FIGS. 5A–5G show the sequence of operations in the handling of a heavy casting with the apparatus of FIG. 4.

The embodiment shown in FIGS. 4 and 5 is similar and corresponding reference numerals, with an index added, have been used where applicable. This embodiment is suitable for use with very heavy castings. A table 2' carries an array of vertically movable rods 3' but instead of being spring-loaded, the rods are formed by the piston rods of pneumatic rams 14. The rods are clamped by pneumatic hoses 12' arranged immediately below the top surface of the table 2'.

Initially the rods 3' are all fully retracted so that their tips are flush with the surface of the table, so a casting that is too heavy to lift can be man-handled or pushed by power means onto the table horizontally. If desired, rollers or balls may be mounted in the surface of the table to facilitate this movement. Then air is admitted to the rams to lift the rods to engage the casting. It can be arranged that any rods which rise to their full extent unhindered, indicating that they are clear of the casting, are automatically retracted straight away, so that they do not interfere with access to the casting during treatment.

It will be noted that in the embodiment illustrated in FIG. 4, the table 2' is itself mounted on hydraulic rams 15. This enables the table to be retracted down to floor level to receive a casting then raised, when the casting is in place, to a height convenient for working.

Sketches A to G in FIG. 5 show the successive stages of operation of the equipment of FIG. 4. With the table 3' lowered, a casting is brought into position (A,B) then the rods are raised to engage the casting (C) and the table is raised (D) to bring it to a convenient height. After completion of the fettling or other treatment the table is lowered (E), the rods are retracted (F) and finally the casting is removed (G). The lines 16 indicate the side walls of a booth, against the underside of which the table 2' becomes sealed in its raised position, so the fettling can be carried out in a confined area from which dust is extracted.

Instead of being mounted either on springs or on rams, the rods could simply be raised manually. Another possibility is for their lower ends to enter a fluidised bed of granules which tends to lift them all equally but independently.

I claim:

1. In a work holder for locating a workpiece of irregular shape during treatment, said holder comprising a flat horizontal table and a two-dimensional array of vertically disposed spaced-apart rods mounted to be vertically movable in relation to said table and protrudable upwards through said table, the improvement which comprises upper and lower horizontal table surfaces through which said rods protrude upwards, there being a working clearance between each of said rods and each said surface, said first and second horizontal surfaces defining therebetween a plenum chamber, and means for admitting air under pressure to said chamber whereby to produce an upward flow of air through said clearance between each of said rods and said upper table surface to prevent the ingress of debris from a workpiece supported by said rods.

2. A work holder for locating a workpiece of irregular shape during treatment, said holder comprising a flat horizontal table and a two-dimensional array of vertically disposed spaced-apart rods mounted to be vertically movable in relation to said table and protrudable upwards through said table, and including means for clamping said rods individually in position against vertical movement, wherein said clamping means comprise a respective loose tube surrounding each said rod and located against vertical movement, and an inflatable hose passing alongside said tube and adapted, on admission of air into said hose, to displace said tube laterally to engage said rod frictionally.

3. In a work holder for locating a workpiece of irregular shape during treatment, said holder comprising a flat horizontal table and a two-dimensional array of vertically disposed spaced-apart rods mounted to be vertically movable in relation to said table between lowermost and uppermost limiting positions and protrudable upwards through said table, means acting on each of said rods individually to urge each said rod upwards towards said uppermost limiting position, means for clamping against movement each said rod with predetermined force in any intermediate position between said uppermost and lowermost limiting positions, the improvement wherein said clamping means include means for reducing the clamping force to a level enabling said rods to be manually pushed downwardly towards said lowermost position against the action of said clamping means and the means urging said rods upwardly, the relationship between the means urging said rods upwardly and said reduced clamping force being such that a rod so pushed downwardly remains clamped at the position to which it has been pushed.

4. The work holder set forth in claim 3 wherein the means urging said rods upwardly comprises fluid pressure means.

5. In a work holder for locating a workpiece of irregular shape during treatment, said work holder comprising a flat horizontal table and a two-dimensional array of vertically disposed spaced-apart rods mounted to be vertically movable in relation to said table between lowermost and uppermost limiting positions and protrudable upwards through said table, fluid-pressure means acting individually on each of said rods to move said rod vertically, and means for clamping said rods in intermediate positions between said uppermost and lowermost positions, the improvement comprising means responsive to movement of any of said rods to its uppermost limiting position for operating said fluid pressure means to retract automatically said rod to its lowermost limiting position.

6. The work holder set forth in claim 5 wherein, in said lowermost limiting position, said rods are wholly below said table.

* * * * *